United States Patent [19]

Stauffer

[11] 3,829,849

[45] Aug. 13, 1974

[54] MEANS FOR PROVIDING THERMOCOUPLE FAILURE DETECTION IN A MULTIPLE PROBE SYSTEM

[75] Inventor: Reuben L. Stauffer, Hampton, Va.

[73] Assignee: The Bendix Corporation, Southfield, Mich.

[22] Filed: Mar. 26, 1973

[21] Appl. No.: 345,160

[52] U.S. Cl............. 340/248 E, 73/341, 73/343 R, 340/228 R, 340/256
[51] Int. Cl. .......................................... G08b 21/00
[58] Field of Search............ 340/248 E, 256, 228 R, 340/214, 409, 248 A, 253 R, 213 R, 248 R; 73/341, 343

[56] References Cited
UNITED STATES PATENTS

| 2,839,741 | 6/1958 | Kratville | 340/214 |
| 2,917,731 | 12/1959 | Rodgers | 340/214 UX |
| 3,163,708 | 12/1964 | McMains | 340/214 UX |
| 3,582,926 | 6/1971 | Hassan | 340/228 R |

*Primary Examiner*—John W. Caldwell
*Assistant Examiner*—Daniel Myer
*Attorney, Agent, or Firm*—W. G. Christoforo; Bruce L. Lamb

[57] ABSTRACT

A select high multiple thermocouple probe circuit includes a plurality of operational amplifiers, each operational amplifier being associated respectively with an individual thermocouple. Each thermocouple is resistively coupled across the input terminals of its associated operational amplifier so that the operational amplifier generates an output signal which is proportional to the temperature at which the thermocouple is exposed. The output terminals of each operational amplifier is connected through an associated diode to a circuit output terminal so that only the highest operational amplifier output voltage appears at the circuit output terminal. The operational amplifier feedback circuits are arranged so that should a thermocouple become either open or shorted, the output voltage from that operational amplifier becomes abnormal. This abnormal voltage is sensed through a further diode network to indicate that a thermocouple failure has occurred.

5 Claims, 1 Drawing Figure

MEANS FOR PROVIDING THERMOCOUPLE FAILURE DETECTION IN A MULTIPLE PROBE SYSTEM

BACKGROUND OF THE INVENTION

This invention relates to redundant thermocouple probe systems in which a valid indication is defined as the highest temperature indicated. The invention is particularly adapted for use as a combustion chamber temperature sensor for a fuel control system for gas turbine engines.

In controlling the fuel flow for a gas turbine engine one of the parameters that must be determined is the combustion chamber temperature. It is desirable in determining this temperature that a redundant thermocouple probe system be used and that the highest temperature indicated by the plurality of thermocouples be taken as the valid combustion chamber temperature. Usually, three thermocouples are used so that failure of any one thermocouple still permits combustion chamber temperatures to be monitored. It is also desirable that an indication be provided to the operator if any thermocouple fails so that it may be repaired before other thermocouples fail with resultant failure of the fuel control system.

It is thus an object of this invention to provide a thermocouple failure detector for use in a multiple thermocouple probe system.

It is another object of this invention to provide a thermocouple failure detection system of the type described which is inexpensive to make and which is easily incorporated into present day redundant probe thermocouple systems.

SUMMARY OF THE INVENTION

An individual operational amplifier is associated with each thermocouple used with the thermocouple being resistively coupled across the input terminals of the operational amplifier. Each operational amplifier thereby generates an output signal which is proportional to the temperature to which its associated thermocouple is exposed. The operational amplifier output terminals are coupled through diodes to a circuit output so that only the highest operational amplifier output signal appears at the circuit output terminal. In addition, the operational amplifier feedback circuits are arranged so that should one or more thermocouples indicate a temperature much lower than the temperature of the other thermocouples, its associated operational amplifier generates an abnormal voltage. This abnormal voltage is detected through a further diode circuit and is used as an indication of thermocouple failure.

The FIGURE is a schematic of the embodiment of the invention.

DESCRIPTION OF THE PREFERRED EMBODIMENT

Figure 1:
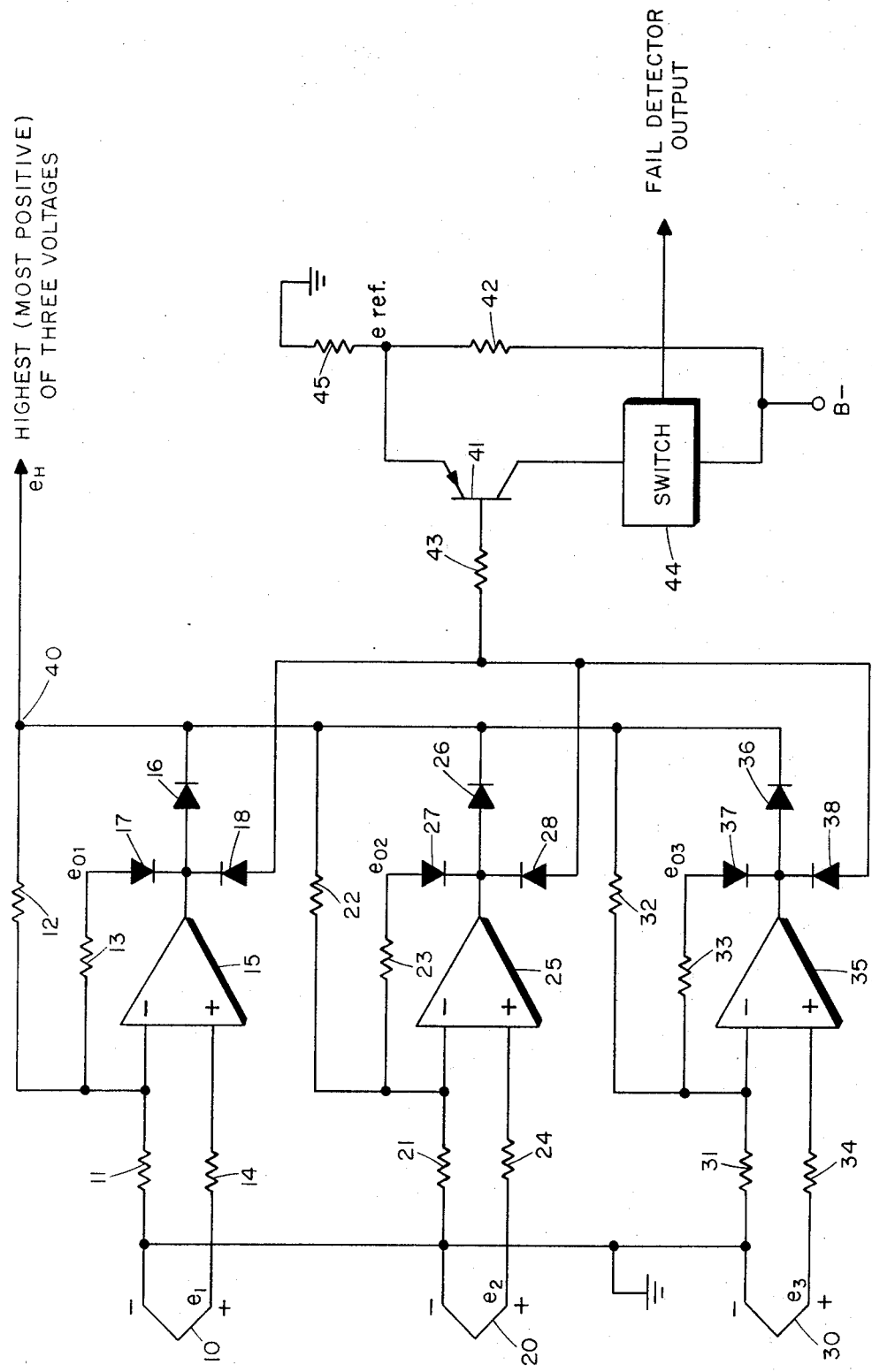

Refer to the figure which shows a three-probe thermocouple temperature sensor which includes thermocouples 10, 20 and 30. Associated with each thermocouple is an amplifier which includes the operational amplifiers 15, 25 and 35, respectively. Each thermocouple is resistively coupled across its associated operational amplifier input terminals. For example, thermocouple 10, has its relatively low voltage port connected through resistor 11 to the inverting input terminal and its relatively high voltage port connected through resistor 14 to the non-inverting input terminal. In addition, each operational amplifier is shunted across its inverting terminal and its output terminal by a resistor and diode serially connected, for example, resistor 13 and diode 17, shunted across operational amplifier 15. In addition, each amplifier includes a further feedback circuit comprised of a further resistor and diode, for example, diode 16 and resistor 12, connected across operational amplifier 15. All thermocouple amplifiers are normally the same, that is:

R11 = R21 = R31
R12 = R22 = R32
R13 = R23 = R33
R14 = R24 = R34

The junction of the diode and resistor in the further feedback circuit of each amplifier is connected in common to terminal 40 at which terminal the highest (most positive) of the thermocouple voltages appears. This highest voltage is designated $e_H$.

The output terminal of each operational amplifier is connected through a diode, for example, diodes 18, 28 and 38, to a failure detector circuit. The failure detector circuit is comprised of PNP transistor 41 having its base electrode connected through resistor 43 to the common anode electrode of diodes 18, 28 and 38. A resistor 45 and current sensing switch 44 are connected in the collector-emitter circuit of transistor 41 across a source of voltage designated herein B−. A resistor 42 is connected between the transistor emitter electrode and the B− voltage terminal.

The circuit operates as follows. Assume one of the diodes 16, 26 or 36 to be conducting. For example, assume that diode 16 is conducting indicating that thermocouple 10 is exposed to the highest temperature. Then $e_H$, the temperature indication, can have a range of positive voltages and $e_H$ will be determined as follows, where $e_1$, $e_2$ and $e_3$ are the voltages generated by thermocouples 10, 20 and 30, respectively and $e_{01}$, $e_{02}$ and $e_{03}$ are the voltages at the anode of diodes 17, 27 and 37, respectively: (Note that, because diode 16 is conducting and $e_H$ is positive, diode 17 is back biased and current in resistor 13 is zero.)

$(e_H - e_1)/R12 - (e_1/R11) = 0$ where R signifies "the value of resistor"

$e_H/R12 = (e_1/R11) + (e_1/R12)$
$e_H = e_1(1 + [R12/R11])$
$e_1 = e_H/[1 + (R12/R11)]$

Because all amplifiers are the same:

$e_1 = e_H/[1 + (R12/R11)] = e_H/[1 + (R22/R21)] = e_H/[1 + (R32/R31)]$

If diode 26 is also conducting, it is necessary that $e_2 = e_1$. And if diode 36 is also conducting, it is necessary that $e_3 = e_1$. If $e_1$, $e_2$ and $e_3$ are not equal, then the largest, which is capable of generating the most positive $e_H$, will control $e_H$. For discussion, say this is $e_1$. Then diode 16 will be conducting, and diodes 26 and 36 will be reverse biased.

A probe is considered to have failed if it is open, short-circuited, or if it indicates a temperature lower than the highest temperature by some pre-determined amount. For discussion, assume thermocouple 10 is giving the highest indication, $e_1$; and $e_2$ and $e_3$ are both lower than $e_1$. Consider the amplifier associated with thermocouple 20:

$[(e_H - e_2)/R22] + [(e_{02} - e_2)/R23] - (e_2/R21) = 0$
$(e_H/R22) - (e_2/R22) - (e_2/R23) - (e_2/R21) = e_{02}/R23$ $e_{o2} = -R23[(e_H/R22)-(e_2/R22)-(e_2/R21)-(e_2/R23)]$
$e_{o2} = e_2-(R23/R22)[e_H-e_2(1+[R22/R21])]$
$e_{o2} = e_2-(R23/R22)(1+[R22/R21])([e_H/1+(R22/R21)]-e_2)$
$e_{o2} = e_2-(R23/R22)(1+[R22/R21])(e_1-e_2)$

The coefficient R23/R22 (1+[R22/R21]) will normally have values between 200 and 600. If $e_2$ is more than a few percent smaller than $e_1$, then $e_{o2}$ will have a range of negative values essentially proportional to $(e_1-e_2)$. The same will be true of any amplifier whose input thermocouple gives a reading significantly lower than the highest reading thermocouple. The negative output of an amplifier is connected through a diode, 18, 28 or 38 and a series resistor 43 to the base of transistor 41. Transistor 41 is normally cut off. If the output of any amplifier becomes more negative than the reference voltage at the emitter electrode of transistor 41, that transistor will conduct. Any suitable device or circuit 44 can be used to sense the presence of current in transistor 41 and to drive a suitable failure indicator. A short-circuited thermocouple will give a low temperature indication which will cause the failure detector to respond in the same way as above. An open-circuited thermocouple will also result in a negative voltage from its amplifier, which, as before will trip the failure indicator. If the input bias current must flow into the input terminals of the operational amplifier, and if the thermocouple is open-circuited, the non-inverting input of the amplifier will go negative with respect to the inverting terminal, which is connected through a resistor to ground, and the output of the amplifier will go to negative extreme. If an amplifier is used which requires input bias current to flow out of the input terminals, then the design of the circuit must be changed to reverse the thermocouple connections, and reverse the diodes, 16, 17, 18, 26, 27, 28, 36, 37 and 38. The temperature signal $e_H$, will then have a range of negative voltages, and the failure outputs will have a range of positive voltages. The failure detector must in that case be made to respond to a positive voltage, rather than to a negative voltage.

The invention claimed is:

1. A select high multiple thermocouple probe circuit including a plurality of thermocouple probes, each having first and second ports, and a plurality of amplifier means, each said amplifier means being associated respectively with an individual one of said thermocouple probes and comprising:

an operational amplifier having inverting and non-inverting input terminals and an output terminal;

a first resistor connected between said first port and one of said input terminals;

a second resistor connected between said second port and the other of said input terminals;

a first diode and a third resistor serially connected between one of said operational amplifier input terminals and said operational amplifier output terminal;

a second diode and a fourth resistor serially connected across said first diode and third resistor;

wherein the junction points of the second diodes and the fourth resistors of each said amplifier means are connected to one another and comprise a circuit output terminal on which a voltage appears which is proportional to the highest temperature to which all said thermocouple probes are exposed, and wherein said probe circuit additionally comprises:

a source of a reference voltage level, means connecting said reference voltage level to all the first ports, a plurality of third diodes, each said third diode being associated respectively with a particular amplifier means and having one end connected to its associated operational amplifier output terminal and the other ends of said third diodes being connected together; and, means responsive to current flow in said third diodes for indicating failure of at least one of said thermocouple probes.

2. The circuit of claim 1 wherein all the first resistors are equal, all the second resistors are equal, all the third resistors are equal and all the fourth resistors are equal.

3. The circuit of claim 2 wherein said reference voltage level is ground and said one of said input terminals is said inverting input terminal.

4. The circuit of claim 3 wherein the cathode of said first and third diodes and the anode of said second diode are connected in common to the output terminal of their associated operational amplifier.

5. The circuit of claim 2 wherein said means for indicating failure comprises:

a transistor having a base electrode and an emitter-collector circuit;

a voltage source connected across said emitter-collector circuit;

means for connecting said base electrode to the other ends of said third diodes; and, means responsive to current change in said emitter-collector circuit for indicating failure of at least one of said thermocouple probes.

* * * * *